UNITED STATES PATENT OFFICE.

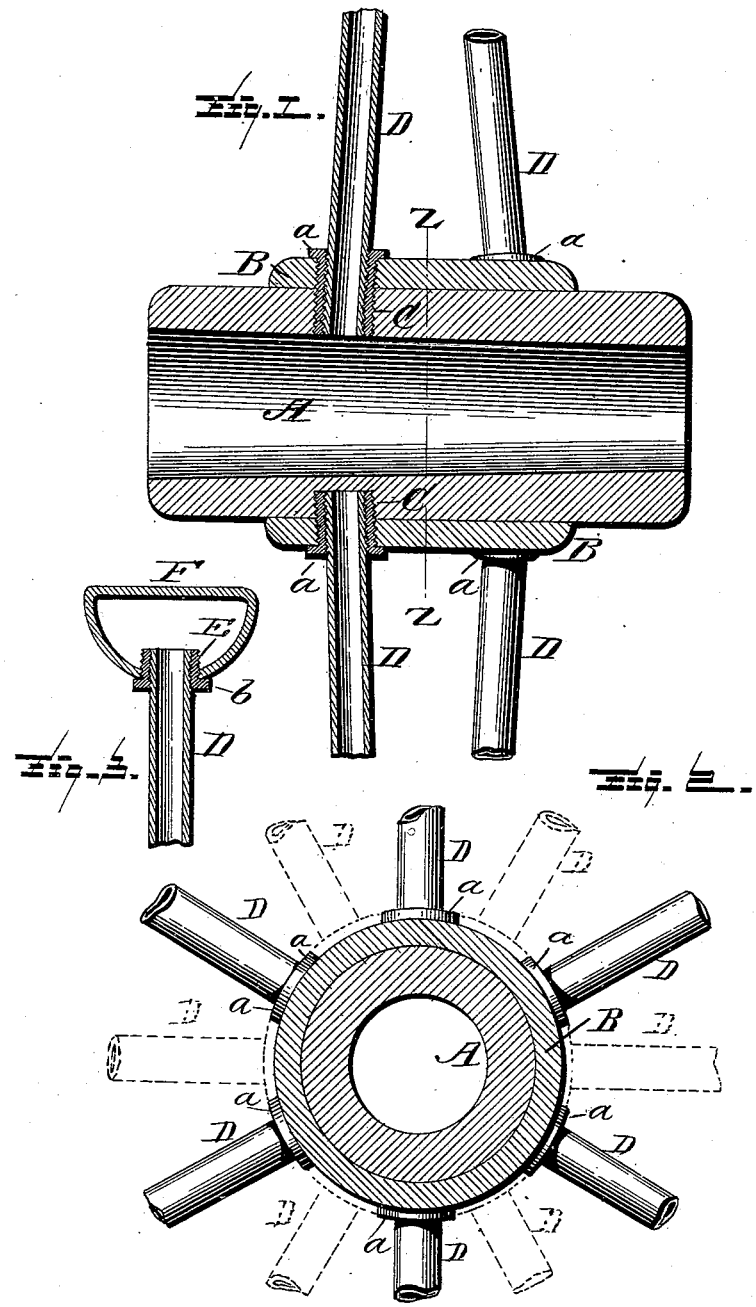

PETER DENNAU, SR., OF MONTAGUE, MICHIGAN.

VEHICLE-WHEEL.

SPECIFICATION forming part of Letters Patent No. 450,144, dated April 14, 1891.

Application filed November 17, 1890. Serial No. 371,693. (No model.)

*To all whom it may concern:*

Be it known that I, PETER DENNAU, Sr., a citizen of the United States, residing at Montague, in the county of Muskegon and State of Michigan, have invented certain new and useful Improvements in Vehicle-Wheels; and I do hereby declare that the following is a full, clear, and exact description of the same, reference being had to the annexed drawings, making a part of this specification, and to the letters of reference marked thereon.

Figure 1 of the drawings represents a longitudinal section of a vehicle-hub constructed in accordance with my invention; Fig. 2, a transverse section taken on line $z\ z$ of Fig. 1; Fig. 3, a detail sectional view showing the manner of attaching the spokes to the wheel.

The present invention has relation to a vehicle-wheel, and has for its object to improve the construction thereof, whereby a strong, durable, and effective wheel is provided, and in which the spokes can be readily removed from the hub and felly for repairs or for other purposes, and when connected will possess strength and increased durabilty. These several objects above enumerated I attain by the construction substantially as shown in the drawings and hereinafter described and claimed.

In the accompanying drawings, A represents the metal hub, around which is placed the re-enforce metal band B, which has screw-threaded holes to receive an exterior and interior screw-threaded sleeve C, having upon its outer end an annular flange $a$. The screw-threaded hole in the band B passes entirely through it; but it is not necessary that it pass entirely through the hub, and, if preferred, it may only extend a portion of the way, as shown in Fig. 1, this not effecting the principle of my invention, and I therefore reserve the right to make such minor changes in the details of construction as would come within ordinary mechanical skill.

The sleeve C provides a means of connecting the re-enforce band B to the hub A, as well as the screw-threaded end of the hollow metal spokes D, which are screw-threaded at both ends to engage with the screw-threaded sleeve C on the hub and a similar screw-threaded sleeve E, with flange $b$, on the felly F.

The means employed for attaching the hollow spokes D to the hub and felly secures greater strength at the point of juncture and forms a more durable and rigid connection between the hub and felly in addition to enabling the spokes to be readily removed when required and as conveniently replaced.

Having now fully described my invention, what I claim as new, and desire to secure by Letters Patent, is—

In a vehicle-wheel, the hub thereof having a re-enforce metal band upon its exterior, in combination with the hollow spokes screw-threaded at both ends and the flanged sleeves having interior and exterior screw-threads, substantially as and for the purpose set forth.

In testimony that I claim the above I have hereunto subscribed my name in the presence of two witnesses.

PETER DENNAU, SR.

Witnesses:
MAURICE DOWNEY.
MINNIE STRENG.